US012349001B2

(12) United States Patent
Sarma et al.

(10) Patent No.: US 12,349,001 B2
(45) Date of Patent: Jul. 1, 2025

(54) SYSTEMS AND METHODS FOR ANALYTICS AND INFORMATION SHARING BETWEEN A RADIO ACCESS NETWORK AND A CORE NETWORK

(71) Applicant: Verizon Patent and Licensing Inc., Basking Ridge, NJ (US)

(72) Inventors: Sandeep Sarma, Chennai (IN); Kristen Sydney Young, Mine Hill, NJ (US); Vishwanath Ramamurthi, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

(21) Appl. No.: 18/046,692

(22) Filed: Oct. 14, 2022

(65) Prior Publication Data
US 2024/0129774 A1    Apr. 18, 2024

(51) Int. Cl.
*H04W 24/10*  (2009.01)
*H04W 92/22*  (2009.01)

(52) U.S. Cl.
CPC ............ *H04W 24/10* (2013.01); *H04W 92/22* (2013.01)

(58) Field of Classification Search
CPC ..... H04W 24/00; H04W 24/02; H04W 24/04; H04W 24/10; H04W 92/00; H04W 92/16; H04W 92/22
See application file for complete search history.

(56) References Cited

U.S. PATENT DOCUMENTS

| | | | | |
|---|---|---|---|---|
| 11,310,731 B1* | 4/2022 | Feder | .................. | H04W 8/08 |
| 2022/0408423 A1* | 12/2022 | Ljung | .................. | H04W 72/20 |
| 2023/0209490 A1* | 6/2023 | Zhu | .................. | H04W 8/18 |
| | | | | 455/435.1 |
| 2024/0129876 A1* | 4/2024 | Sarma | .................. | H04W 60/06 |

OTHER PUBLICATIONS

Third Generation Partnership Project, "Technical Specification Group Services and System Aspects; System Architecture for the 5G System (5GS); Stage 2 (Release 17)," TS 23.501 V17.6.0 (Sep. 2022).
Third Generation Partnership Project, "Technical Specification Group Services and System Aspects; Architecture Enhancements for 5G System (5GS) to Support Network Data Analytics Services (Release 17)," TS 23.288 V17.6.0 (Sep. 2022).

(Continued)

*Primary Examiner* — Siu M Lee

(57) ABSTRACT

A system described herein may register a particular radio access network ("RAN")-based interface, such as a R1 interface, with a RAN, such as an Open-RAN ("O-RAN"). The system may further be associated with a particular Service-Based Interface ("SBI") of a core network that includes a plurality of network functions ("NFs"), where each NF is associated with a respective SBI. The system may receive, via the particular SBI, a request for RAN information from one or more NFs of the core network, obtain the RAN information from the RAN via the particular interface, output the requested RAN information to the one or more NFs of the core network via the particular SBI. Associating the system with the SBI may be performed without modifying a Network Repository Function ("NRF") of the core network.

20 Claims, 16 Drawing Sheets

(56) References Cited

OTHER PUBLICATIONS

Third Generation Partnership Project, "Technical Specification Group Core Network and Terminals; 5G System; Network Data Analytics Services; Stage 3 (Release 17)," 3GPP TS 29.520 V17.8.0 (Sep. 2022).
O-RAN Alliance, "O-RAN Working Group 2 Non-RT RIC Architecture," O-RAN.WG2.Non-RT-RIC-ARCH-TS-v02.00 (Mar. 2022).
O-RAN Alliance, "O-RAN Working Group 2(Non-RT RIC and A1 interface WG), R1 Use Cases and Requirements," O-RAN.WG2.R1 Use Cases and Requirements—v01.00 (Jan. 2022).
O-RAN Alliance, "O-RAN Working Group 2 (Non-RT RIC and A1 interface WG), R1 interface: General Aspects and Principles," O-RAN.WG2.R1GAP-v02.00 (Mar. 2022).

* cited by examiner

SYSTEMS AND METHODS FOR ANALYTICS AND INFORMATION SHARING BETWEEN A RADIO ACCESS NETWORK AND A CORE NETWORK

BACKGROUND

Wireless networks may include radio access networks ("RANs"), such as Long-Term Evolution ("LTE") networks, Fifth Generation ("5G") networks, or other types of RANs. RANs may provide wireless connectivity to User Equipment ("UEs"), such as mobile telephones, Internet of Things ("IoT") devices, automated guided vehicles ("AGVs"), or the like. RANs may be communicatively coupled to core networks, such as an Evolved Packet Core ("EPC"), a 5G Core ("5GC"), that provide routing services or other types of services. End-to-end Quality of Service ("QoS") metrics associated with UEs that connect to a core network via a RAN may be impacted by the performance of both the core network and the RAN.

DETAILED DESCRIPTION OF EXAMPLE EMBODIMENTS

Figure 1A:
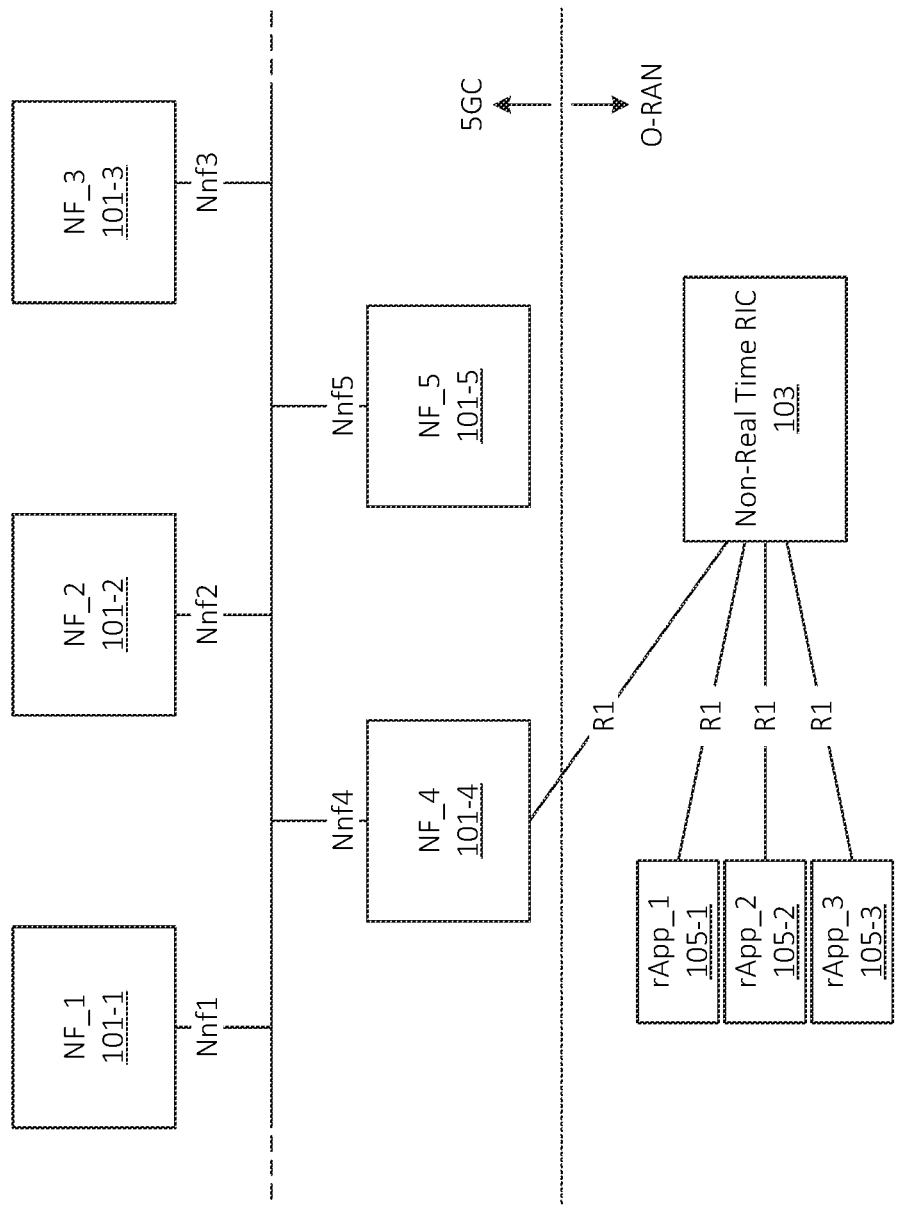
FIGS. 1A-1C illustrate an example overview of one or more embodiments described herein.

The following detailed description refers to the accompanying drawings. The same reference numbers in different drawings may identify the same or similar elements.

End-to-end QoS metrics associated with UEs that connect to a core network via a RAN may be impacted by the performance of both the core network and the RAN. In some situations, a core network and a RAN may both be operated by separate entities, and/or may otherwise not typically communicate with each other. Thus, in situations where RAN performance is degraded, end-to-end performance may be degraded even if core network performance is within acceptable thresholds.

Embodiments described herein provide for the intercommunication between a RAN and a core network, such that a core network is able to receive information (e.g., analytics information, congestion information, event information, etc.) associated with a RAN to which the core network is connected. Some embodiments described herein provide for the intercommunication between the RAN and the core network, such that the RAN is able to receive information associated with the core network to which the RAN is connected. Accordingly, a RAN may be able to adjust RAN parameters in order to account for potential performance issues with a core network. Similarly, in accordance with some embodiments, the core network may be able to adjust core network parameters in order to account for potential performance issues with the RAN. As such, by becoming "aware" of metrics associated with the other, the RAN or the core network may be able to adjust parameters in order to preserve end-to-end QoS metrics when the other is experiencing performance degradations or other potential issues.

In some embodiments, a RAN may include and/or may be implemented as an O-RAN (e.g., based on one or more O-RAN Alliance standards), which defines various functions and interfaces between such functions in order to implement the RAN. Embodiments described herein may provide for the intercommunication between an O-RAN and one or more core networks. In some embodiments, a core network may include or may be implemented by a 5GC (e.g., based on one or more Third Generation Partnership ("3GPP") 5G standards), which may define various network functions ("NFs") and interfaces between such NFs in order to implement the 5GC. In some embodiments, such interfaces may include or may be implemented by service-based interfaces ("SBIs"), in which the 5GC (e.g., a Network Repository Function ("NRF") of the 5GC) may maintain information associating particular NFs with particular SBIs. Such information may be used to appropriately route communications, associated with a given SBI, to an appropriate NF (or NF instance). Embodiments described herein may provide for the intercommunication between a 5GC (or other type of core network that utilizes SBIs or other types of suitable routing mechanisms) and an O-RAN or other type of RAN. In some embodiments, the intercommunication between the core network and the RAN, as discussed herein, may be performed without modifying SBI information associated with the core network (e.g., without adding an additional SBI dedicated to communicating with the RAN).

Figure 1B:
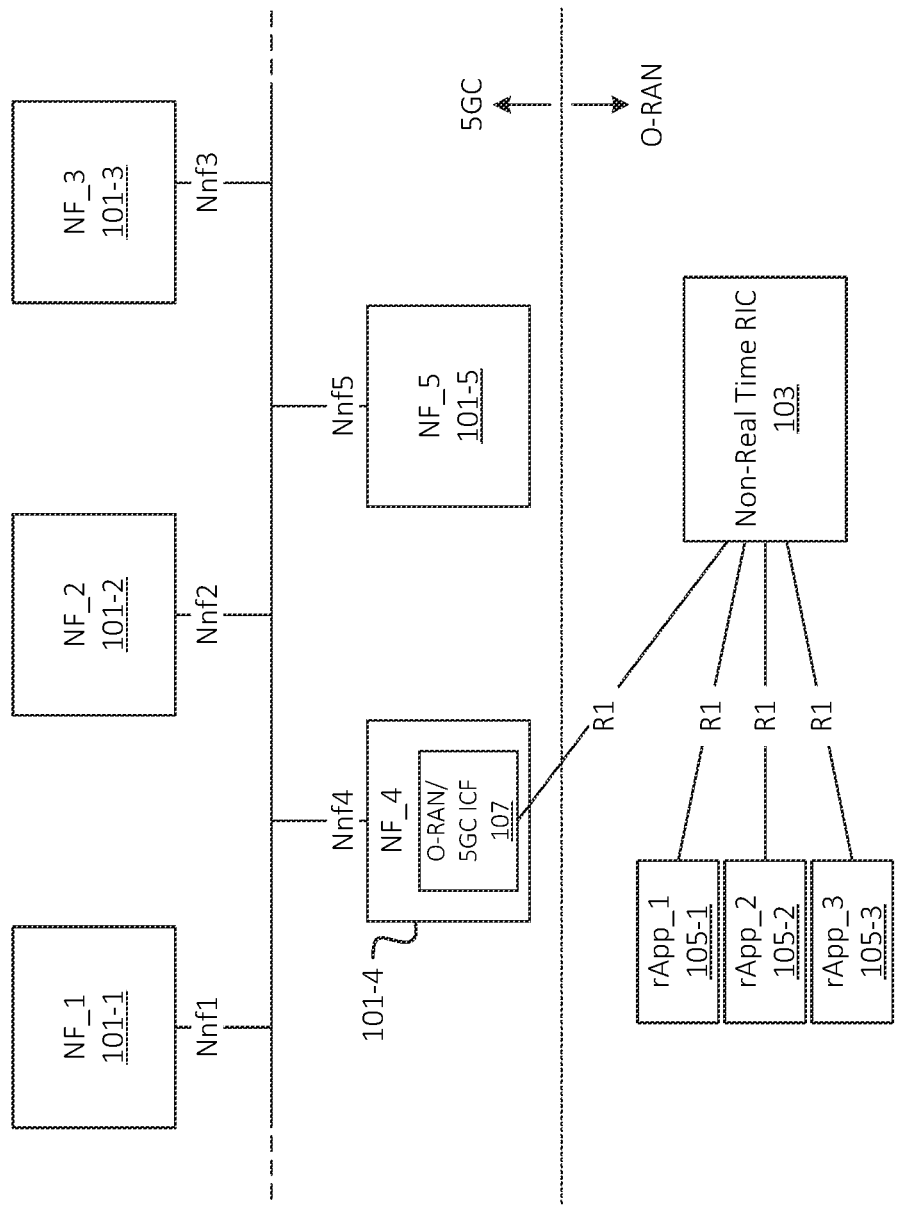
Figure 1C:
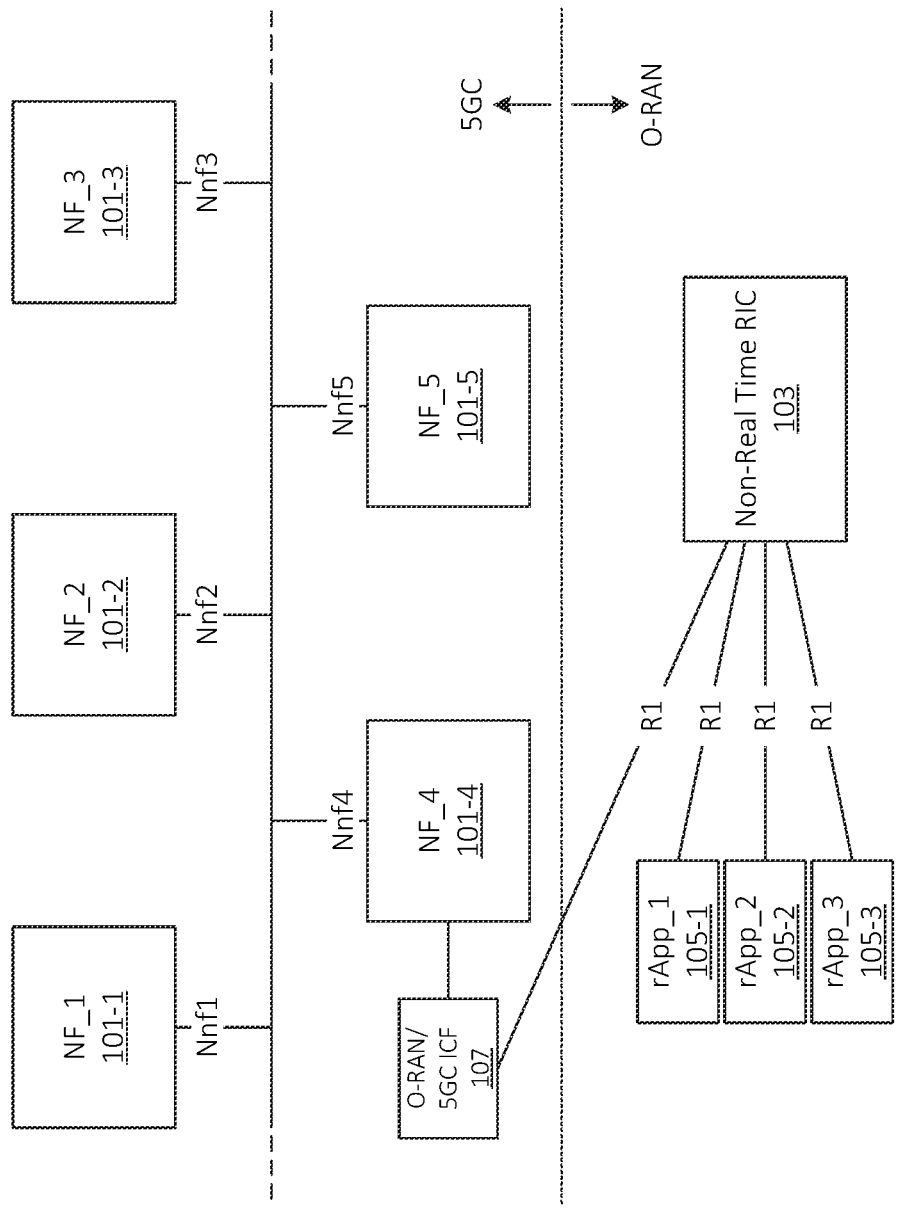

As shown in FIGS. 1A-1C, a core network (e.g., a 5GC and/or some other suitable type of core network) may include a set of network functions ("NFs") 101, which may each perform various operations associated with the core network. For example, although generally referred herein to as "NFs," NFs 101 may be, may include, may be communicatively coupled to, etc. particular NFs or other elements of the 5GC, such as a Data Collection Coordination Function ("DCCF"), a Network Data Analytics Function ("NWDAF"), an Access and Mobility Management Function ("AMF"), a Session Management Function ("SMF"), a User Plane Function ("UPF"), a Unified Data Management function ("UDM"), a Policy Control Function ("PCF"), and/or other suitable element of the 5GC or of another suitable core network.

Each respective NF 101 (e.g., NFs 101-1 through 101-1, in the examples of FIGS. 1A-1C) may be associated with a respective SBI (e.g., NF 101-1 may be associated with a first SBI referred to as "Nnf1," NF 101-2 may be associated with a second SBI referred to as "Nnf2," and so on). As such, communications within the 5GC directed to the "Nnf1" SBI may be routed to NF 101-1, communications within the 5GC directed to the "Nnf2" SBI may be routed to NF 101-2, and so on. Additionally, or alternatively, one or more NFs 101 may be associated with reference point interfaces, such as an N11 interface, an N12 interface, etc. For the purposes of explanation, interfaces between NFs 101 are described in the context of SBIs. In practice, similar concepts described herein may apply for reference point interfaces or other types of communication pathways between NFs 101.

In accordance with one or more embodiments, one or more NFs 101 may implement one or more interfaces that are in accordance with one or more standards, protocols, etc. associated with a particular RAN to which the core network is communicatively coupled, which may include an O-RAN. For example, as shown in FIG. 1A, a particular NF 101 (i.e., NF 101-4, in this example) may implement an R1 interface. The R1 interface may be used, for example, by a controller of the O-RAN, a Service Management and Orchestration ("SMO") framework of the O-RAN, a Non-Real Time RAN Intelligent Controller ("RIC") 103 of the O-RAN, and/or one or more other elements of the O-RAN to communicate with each other. For example, the R1 interface may be implemented by Non-Real Time RIC 103 and/or one or more RAN automation applications ("rApps") 105 (e.g., rApps 105-1, 105-2, and 105-3), via which Non-Real Time RIC 103 is able to send and/or receive communications to and/or from rApps 105. For example, rApps 105 may request RAN information from Non-Real Time RIC 103 and/or one or more functions that are implemented by and/or otherwise associated with Non-Real Time RIC 103. In some embodiments, operations described herein as being performed by Non-Real Time RIC 103 may be performed by a Data Management and Exposure function ("DME"), which may be implemented by, communicatively coupled to, and/or otherwise associated with Non-Real Time RIC 103. The RAN information may include RAN analytics information (e.g., cell load information, quantity of connected UEs, call drop rates, latency information, etc.), RAN event information (e.g., connection or disconnection of UEs, session establishment event information, etc.), and/or other suitable types of RAN information.

Non-Real Time RIC 103 may obtain, aggregate, etc. the RAN information from one or more other elements of the O-RAN (and/or some other source), and may provide the requested RAN information to respective rApps 105. Non-Real Time RIC 103 may obtain, receive, etc. RAN information from one or more rApps 105 or other suitable elements of the O-RAN (e.g., which may provide such information via an A1 interface, an E2 interface, or other suitable interface), and may provide (e.g., via the R1 interface) the requested information to rApps 105, NF 101-4, and/or OICF 107. Additionally, via the R1 interface, rApps 105 may provide RAN configuration parameters, RAN configuration recommendations, alerts, aggregated or processed RAN metrics, and/or other suitable information based on which Non-Real Time RIC 103 may determine and implement modifications to configuration parameters of the O-RAN (e.g., beamforming parameters, QoS parameters, access and mobility parameters, load balancing parameters, and/or other operational parameters).

In accordance with some embodiments, one or more NFs 101 that implement the R1 interface (e.g., NF 101-4, in the examples provided herein) may also communicate with elements of the O-RAN (e.g., Non-Real Time RIC 103). For example, via the R1 interface, NF 101-4 may request and/or receive RAN information from Non-Real Time RIC 103. In some embodiments, NF 101-4 may be a NF of the core network that provides analytics information, event information, and/or other information to other NFs 101. For example, NF 101-4 may be, may include, and/or may be implemented by a DCCF, an NWDAF, an AMF, or other suitable element of the core network that receives and handles information requests from other NFs 101 of the core network. In some embodiments, NF 101-4 may be some other type of NF or element of the core network.

In some embodiments, as shown in FIG. 1B, NF 101-4 may include O-RAN/5GC Intercommunication Function ("OICF") 107, which may implement the R1 interface. For example, in such embodiments, OICF 107 may be integrated in and/or otherwise implemented by the same set of hardware resources, the same virtual machine, the same container or set of containers, etc. as NF 101-4. In some embodiments, as shown in FIG. 1C, OICF 107 may be implemented by a separate set of hardware resources, a different virtual machine, a different container or set of containers, etc. as NF 101-4. In such embodiments, OICF 107 may communicate with NF 101-4 via an application programming interface ("API") or other suitable communication pathway.

As discussed below, other NFs 101 (e.g., NFs 101-1, 101-2, 101-3, 101-5, etc.) may request RAN information (e.g., associated with the O-RAN) from NF 101-4 via an interface (e.g., the Nnf4 SBI) associated with NF 101-4. The RAN information may be obtained by NF 101-4 (and/or by OICF 107), and may be provided to the respective NFs 101 that requested such information. In some embodiments, the implementation of OICF 107 (and/or of associated operations described herein) by NF 101-4, as shown in FIGS. 1A-1C, may allow for the intercommunication between the core network and the RAN without modifying a network topology of the core network. For example, a NRF, that maintains information associating particular NFs 101 with particular SBIs or other interfaces, may not need to be modified to allow for the providing of RAN information by NF 101-4 via the Nnf4 SBI, as the Nnf 4 SBI may have already been registered with the NRF as part of a provisioning or instantiation procedure associated with NF 101-4.

Figure 2:
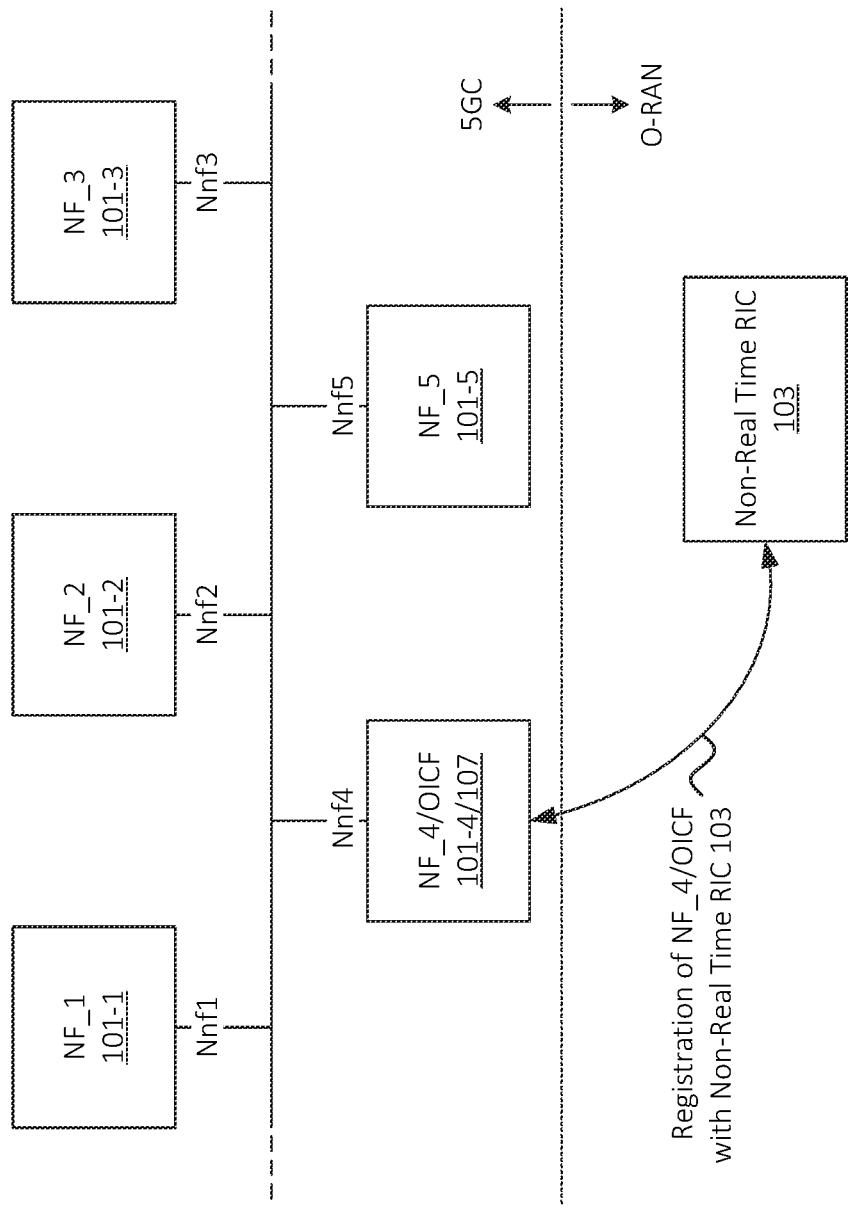
FIG. 2 illustrates an example registration of an intercommunication function with a RAN, in accordance with some embodiments.

In order to establish the R1 interface between OICF 107 (and/or NF 101-4) and the RAN (e.g., Non-Real Time RIC 103 and/or some other element of the O-RAN), NF 101-4 and/or OICF 107 may, as shown in FIG. 2, register with Non-Real Time RIC 103 and/or some other element of the O-RAN. As part of the registration, Non-Real Time RIC 103 may authenticate NF 101-4 and/or OICF 107, identify one or more locators (e.g., an Internet Protocol ("IP") address, a Uniform Resource Locator ("URL"), a Uniform Resource Identifier ("URI"), etc.) of NF 101-4 and/or OICF 107, associate NF 101-4 and/or OICF 107 with the R1 interface, determine or verify types of information that NF 101-4 and/or OICF 107 is/are authorized to request or receive via the R1 interface, and/or other suitable registration procedures.

Figure 3:
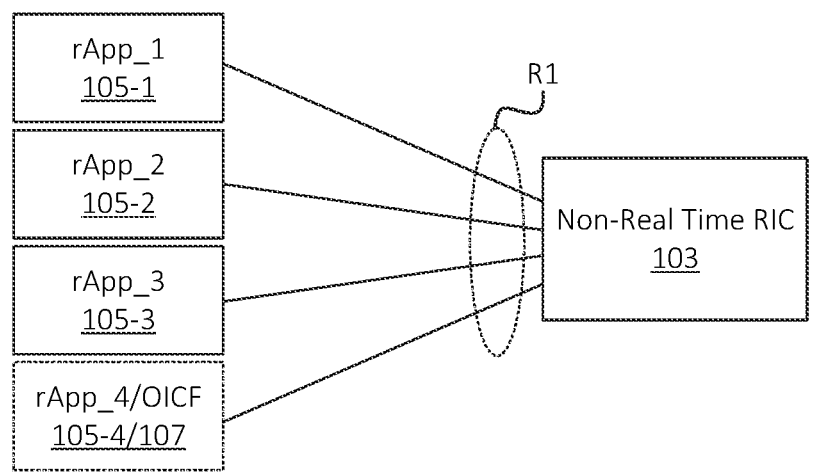
FIG. 3 illustrates an example logical RAN architecture that includes an interface between an interworking function and one or more elements of the RAN, in accordance with some embodiments.

As shown in FIG. 3, once NF 101-4 and/or OICF 107 have been registered with Non-Real Time RIC 103 (e.g., registered as being associated with an R1 interface), OICF 107 may "appear" and/or may otherwise be considered, from the perspective of other O-RAN elements, as another rApp (e.g., rApp 105-4). For example, Non-Real Time RIC 103 may send and/or receive communications to and/or from OICF 107 in the same manner (e.g., according to the same protocols, standards, etc.) as other rApps 105, such as rApps 105-1, 105-2, and 105-3.

In some embodiments, NF 101-4 and/or OICF 107 may maintain information associating a first set of information types to a second set of information types. The first set of information types may be associated with one or more protocols, standards, etc. specified by or implemented by NFs 101 of the core network, and/or in accordance with other suitable protocols or schema. The second set of information types may be associated with one or more protocols, standards, etc. specified by or implemented by elements of the O-RAN (e.g., associated with standards specifying the R1 interface or other suitable standards or protocols).

Figure 4:
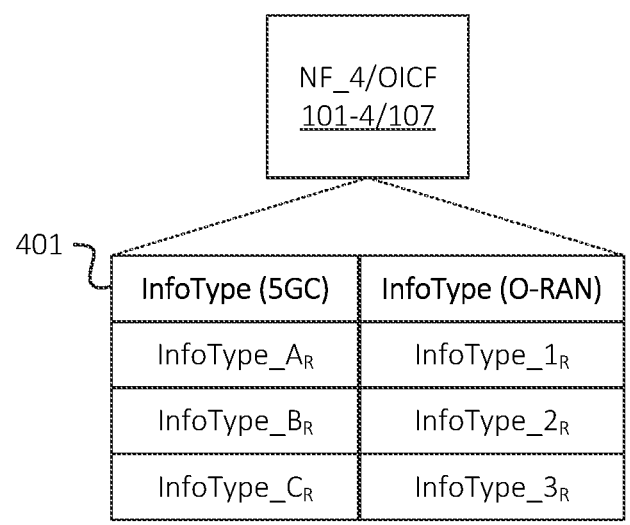
FIG. 4 illustrates an example data structure associating one or more information types, associated with a RAN, with respective information types associated with a core network, in accordance with some embodiments.

As shown in FIG. 4, NF 101-4 and/or OICF 107 may maintain data structure 401, which indicates associations between the first set of information types and the second set of information types. In this example, the first set of information types may include "InfoType_$A_R$," "InfoType_$B_R$," and "InfoType_$C_R$." As discussed above, these information types may be in accordance with information types, associated with standards or protocols associated with the core network (e.g., the 5GC), which specify requests for RAN information. Additionally, or alternatively, the first set of information types may include unstructured data, natural language queries, labels, tags, or other suitable information specifying the type of RAN information being requested. NF 101-4 and/or OICF 107 may utilize data structure 401 when handling RAN information requests, as discussed below.

Figure 5:
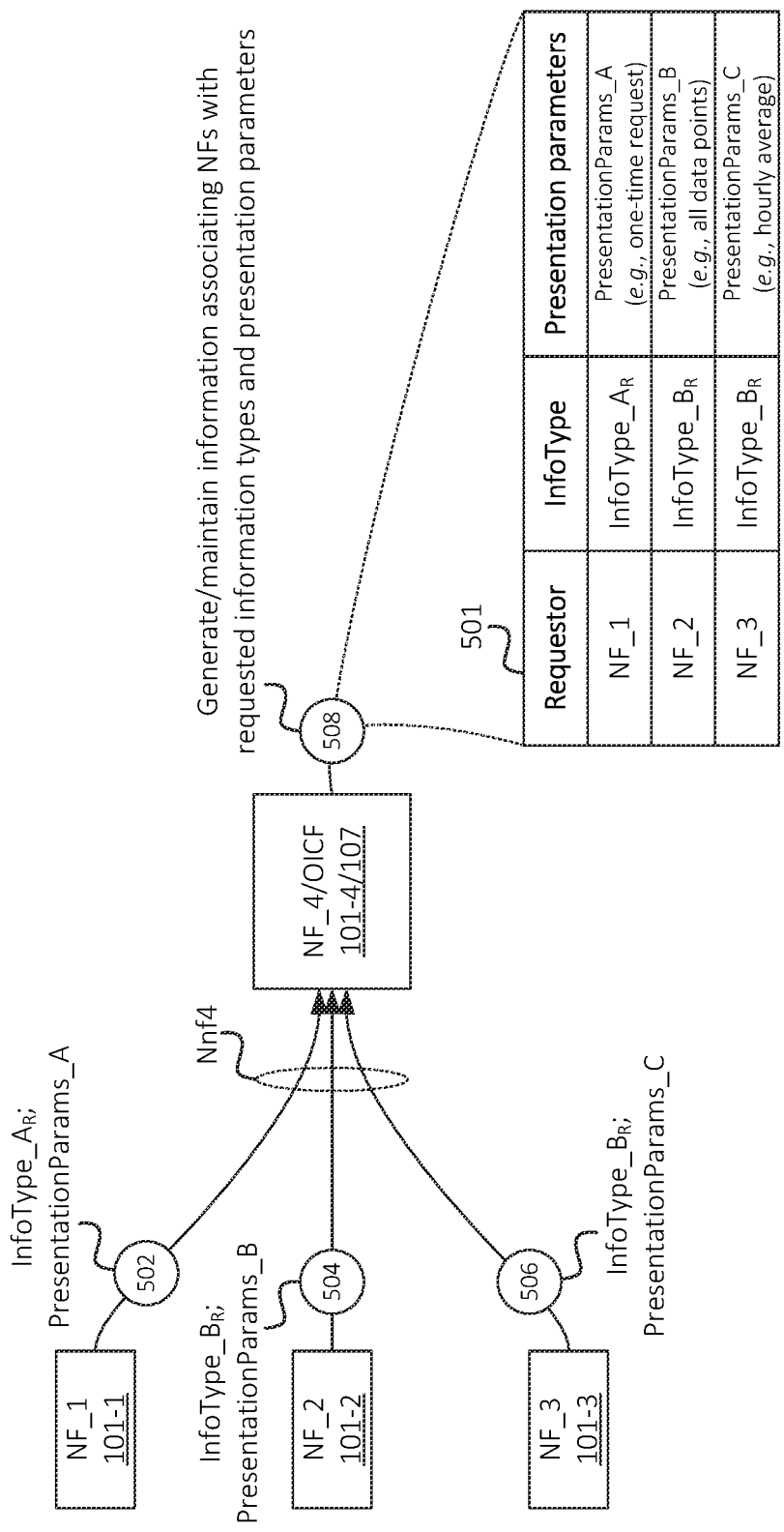
FIGS. 5 and 6 illustrate an example of a core network obtaining RAN information from a RAN, in accordance with some embodiments.
Figure 6:
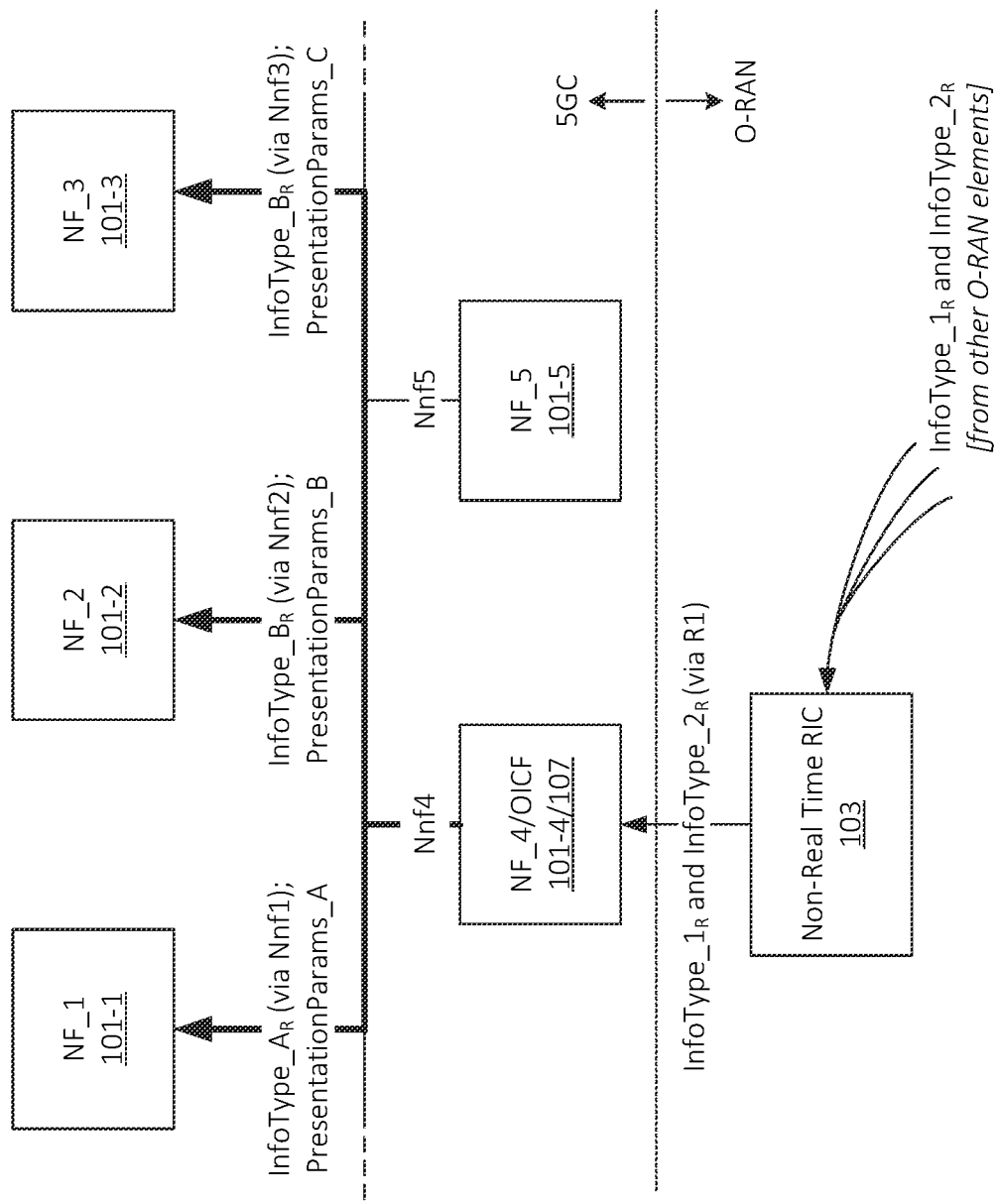

As shown in FIGS. 5 and 6, NF 101-4 and/or OICF 107 may facilitate the providing of RAN information (e.g., RAN analytics information, RAN configuration information, RAN event information, etc.) from elements of the O-RAN to one or more NFs 101 of the 5GC. For example, as shown in FIG. 5, NF 101-4 and/or OICF 107 may receive (via the Nnf4 SBI associated with NF 101-4) a request for RAN information from one or more NFs 101 of the core network. For example, as discussed above with respect to FIGS. 1A-1C, functionality of OICF 107 may be implemented by NF 101-4, and/or NF 101-4 may be communicatively coupled to OICF 107 via an API or other suitable communication pathway. Thus, in some embodiments, OICF 107 may communicate with other NFs 101 via the Nnf4 by virtue of being included in or implemented by NF 101-4. In some embodiments, OICF 107 may communicate with other NFs 101 via NF 101-4, which may communicate with other NFs 101 via the Nnf4 and may forward communications between such NFs 101 and OICF 107 via an API or other suitable communication pathway between NF 101-4 and OICF 107.

In some embodiments, as discussed above, the requests for RAN information may be in accordance with protocols, standards, etc. associated with the core network, and/or may include natural language queries, tags, labels, etc. Generally, for example, in some embodiments the requests for RAN information may be formatted and/or in accordance with different protocols, standards, etc. than implemented by the RAN (e.g., different from O-RAN protocols, standards, etc.). On the other hand, in some embodiments, the requests for RAN information may be in accordance with, or may include messaging that is in accordance with, protocols or standards implemented by the RAN.

In this example, NF 101-4 and/or OICF 107 may receive (at 502) a request for a first type of RAN information (InfoTypeAR) from NF 101-1, and may receive (at 504 and 506) requests for a second type of RAN information (InfoTypeBR) from NFs 101-2 and 101-3, respectively. In some embodiments, NFs 101 may also indicate respective presentation parameters, which may indicate a manner in which the requested RAN information should be provided to NFs 101, and/or may specify other processing to perform on the requested RAN information prior to providing the RAN information to NFs 101.

For example, NF 101-1 may specify a first set of presentation parameters (referred to in the figures as "PresentationParams_A"), NF 101-2 may specify a second set of presentation parameters (referred to in the figures as "PresentationParams_B"), and NF 101-3 may specify a third set of presentation parameters (referred to in the figures as "PresentationParams_C"). The first set of presentation parameters may specify, for example, that NF 101-1 is making a one-time request for InfoType_$A_R$. The second set of presentation parameters may specify, as another example, that NF 101-2 is requesting all data points associated with InfoType_$B_R$ (e.g., as frequently as such data points are received by NF 101-4 and/or OICF 107). The third set of presentation parameters may specify, as yet another example, that NF 101-3 is requesting a daily maximum value of InfoType_$B_R$. Although some examples of presentation parameters have been discussed above, in practice, other types of presentation parameters or processing may be specified, which may refer to computing averages or medians, performing artificial intelligence/machine learning ("AI/ML") processing, performing statistical analyses, and/or performing other suitable operations prior to presenting processed core network information to respective NFs 101.

In order to request (at 502, 504, and 506) the RAN information from NF 101-4 and/or OICF 107, NFs 101-1, 101-2, and 101-3 may indicate, in the requests, that the requests are directed to the Nnf4 SBI associated with NF 101-4. In some embodiments, as discussed above, NF 101-4 may implement functionality of OICF 107, and/or may forward such requests to OICF 107 via an API or other suitable communication pathway. Additionally, or alternatively, a routing element receiving the requests may identify that the requested information types are associated with the Nnf4 SBI and/or should otherwise be routed to NF 101-4. Based on receiving (at 502, 504, and 506), the RAN information requests, NF 101-4 and/or OICF 107 may generate and/or maintain (at 508) data structure 501 and/or some other suitable data structure, indicating which respective NFs 101 have requested which RAN information types, along with presentation parameters for such requested RAN information.

As noted above with respect to FIG. 4, NF 101-4 and/or OICF 107 may maintain information (e.g., in data structure 401 or some other suitable data structure) associating information types, in accordance with protocols, standards, etc. that are implemented by or are otherwise compatible with the RAN (e.g., are compatible with the O-RAN), with information types as requested by NFs 101 (e.g., in accordance with protocols, standards, etc. implemented by the core network, and/or otherwise in a format of requests as provided by NFs 101).

As shown in FIG. 6, NF 101-4 and/or OICF 107 may obtain the requested RAN information (i.e., InfoType_$1_R$ and InfoType_$2_R$, in this example) from Non-Real Time MC 103. For example, NF 101-4 and/or OICF 107 may request, via the R1 interface, InfoType_$1_R$ and InfoType_$2_R$ from Non-Real Time RIC 103. Non-Real Time RIC 103 may obtain the requested information from one or more rApps 105, other elements of the RAN, and/or one or more other suitable information sources, and may provide the requested information to NF 101-4 and/or OICF 107 via the R1 interface.

Based on receiving the requested information, NF 101-4 and/or OICF 107 may output the respective requested RAN information to the NFs 101 that requested the RAN information. In some embodiments, NF 101-4 and/or OICF 107 may translate, encapsulate, reformat, etc. RAN information, as received from Non-Real Time RIC 103, in accordance with one or more protocols, standards, etc. implemented by NFs 101. Additionally, or alternatively, NF 101-4 and/or OICF 107 may pass through, forward, etc. an unmodified version of the received RAN information as received from Non-Real Time RIC 103. In some embodiments, NF 101-4 and/or OICF 107 may perform processing, reformatting, aggregating, and/or other operations in accordance with respective presentation parameters prior to providing RAN information to NFs 101. NF 101-4 and/or OICF 107 may utilize information stored in data structure 501 to route RAN information to the appropriate requestor NFs 101 in accordance with presentation parameters specified by each NF 101.

For example, NF 101-4 and/or OICF 107 may provide InfoType_$A_R$ (e.g., based on received InfoType_$1_R$) to NF 101-1 via the Nnf1 SBI, in accordance with PresentationParams_A. Further, NF 101-4 and/or OICF 107 may provide InfoType_$B_R$ (e.g., based on received InfoType_$2_R$) to NF 101-2 via the Nnf2 SBI, in accordance with PresentationParams_B. Additionally, NF 101-4 and/or OICF 107 may provide InfoType_$B_R$ (e.g., based on received InfoType_$2_R$) to NF 101-3 via the Nnf3 SBI, in accordance with PresentationParams_C. NFs 101-1, 101-2, and 101-3 may modify one or more core network parameters based on the received RAN information (e.g., to account for performance degradations, RAN congestion, and/or other attributes of the RAN as indicated by the received RAN information) and/or based on other information. As another example, NFs 101-1, 101-2, and/or 101-3 may modify parameters of services provided by NFs 101-1, 101-2, and/or 101-3 based on the received RAN information. As yet another example, one or more other NFs 101 of the core network (e.g., NF 101-5) may receive, request, etc. some or all of the received RAN information from NF 101-1, 101-2, and/or 101-3, and may modify parameters associated with NF 101-5 based on the RAN information.

Figure 7:
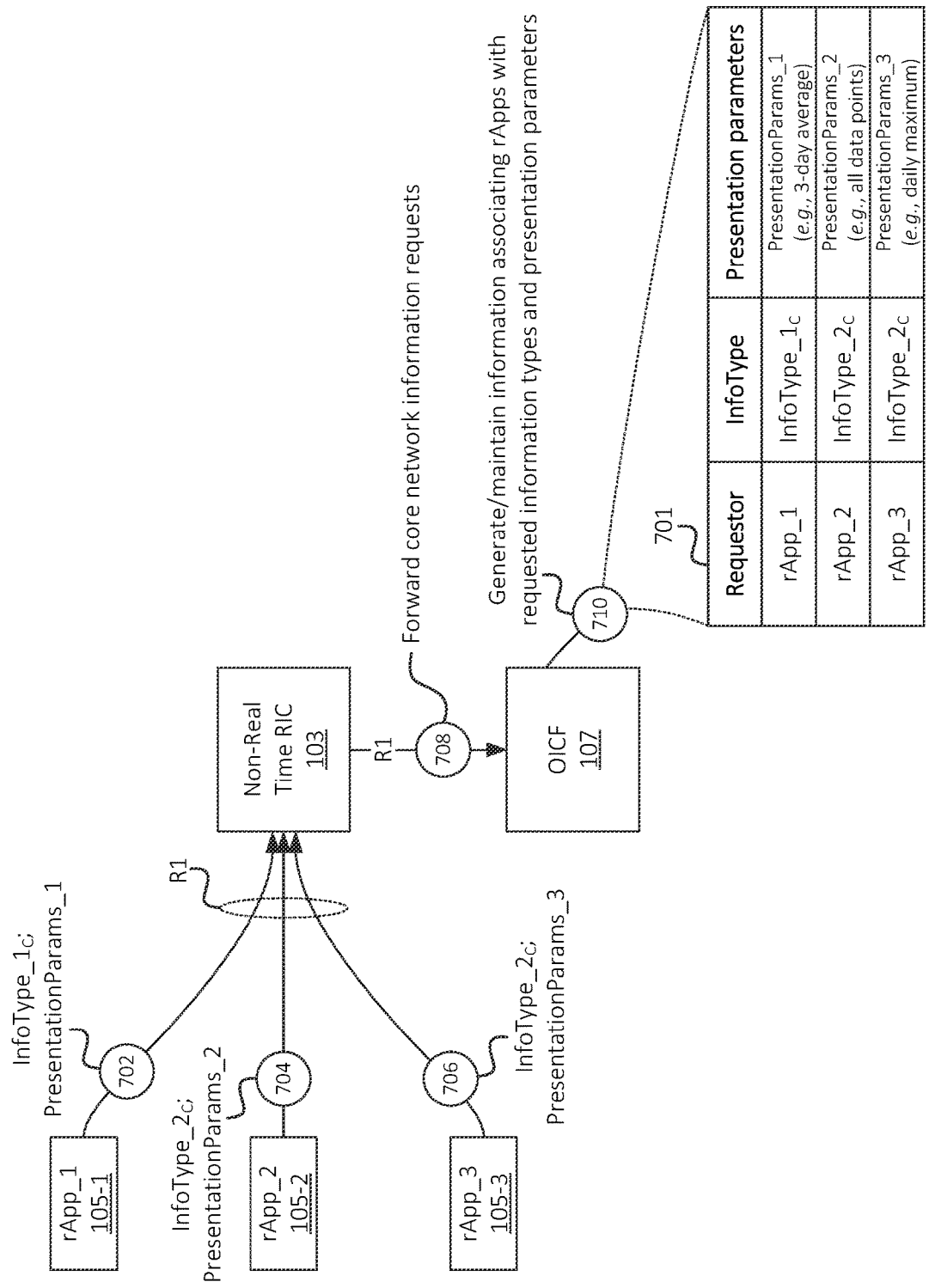
FIG. 7-9 illustrate an example of a RAN obtaining core network information from a core network, in accordance with some embodiments.
Figure 8:
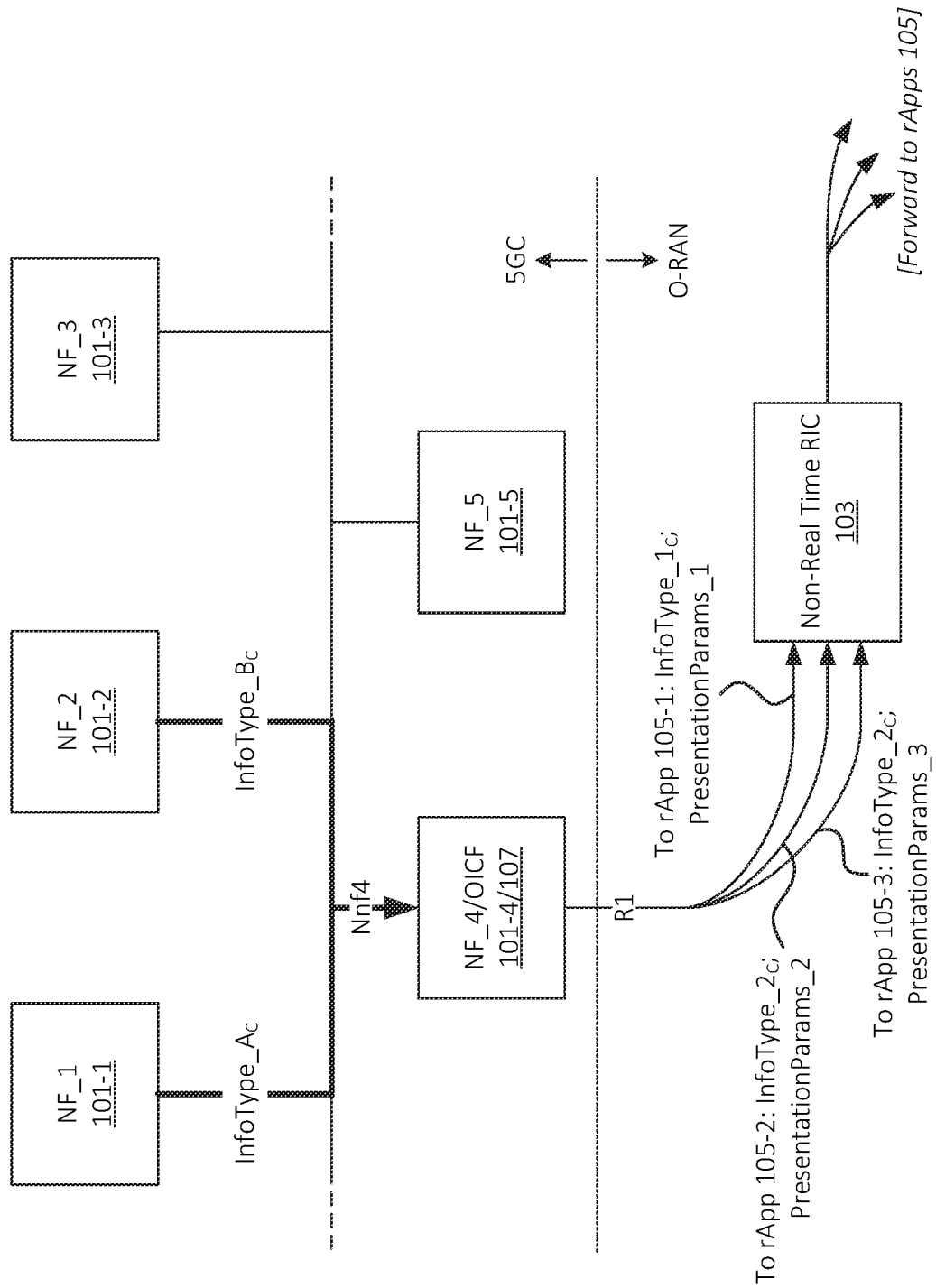

FIGS. 7 and 8 illustrate an example of one or more O-RAN elements, such as one or more rApps 105, obtaining core network information (e.g., from the 5GC) via OICF 107, in accordance with some embodiments. As shown in FIG. 7, Non-Real Time RIC 103 may receive (at 702, 704, and 706) requests for core network information from rApps 105-1, 105-2, and 105-3, respectively. As discussed above, Non-Real Time RIC 103 may receive the requests via an R1 interface. The core network information requests may each specify a particular core network information type, such as user data congestion or load metrics, control plane congestion or load metrics, performance information associated with one or more NFs 101 (e.g., latency, throughput, etc.), performance information associated with one or more network slices, analytics information associated with one or more traffic or service types (e.g., voice call services, data services, AGV control services, etc.), and/or other suitable types of information.

The core network information requests may further, in some embodiments, include presentation parameters, which may specify a manner in which the requested core network information should be processed, presented, formatted, etc. when providing requested core network information to respective rApps 105. For example, rApp 105-1 may specify a first set of presentation parameters (referred to in the figures as "PresentationParams_1"), rApp 105-2 may specify a second set of presentation parameters (referred to in the figures as "PresentationParams_2"), and rApp 105-3 may specify a third set of presentation parameters (referred to in the figures as "PresentationParams_3"). The first set of presentation parameters may specify, for example, that rApp 105-1 is requesting, on a daily basis, a 3-day average of InfoType_$1_C$. The second set of presentation parameters may specify, as another example, that rApp 105-2 is requesting all data points associated with InfoType_$2_C$ (e.g., as frequently as such data points are received by OICF 107). The third set of presentation parameters may specify, as yet another example, that rApp 105-3 is requesting a daily maximum value of InfoType_$2_C$.

Non-Real Time RIC 103 may forward (at 708) the requests, received from rApps 105, to OICF 107 via the R1 interface implemented by OICF 107. For example, in some embodiments, Non-Real Time RIC 103 may identify that the requests are associated should be forwarded to OICF 107 based on mapping or correlation information maintained or received by Non-Real Time RIC 103, where such mapping or correlation information indicates that particular information types (e.g., InfoType_$1_C$ and InfoType_$2_C$) should be forwarded to OICF 107. Additionally, or alternatively, the requests for core network information may indicate OICF 107 as a destination for the requests. In some embodiments, Non-Real Time RIC 103 may identify that the core network information requests are not associated with a protocol or standard associated with RAN information requests, and may forward the requests to OICF 107 based on identifying that the core network information requests are not associated with a protocol or standard associated with RAN information requests. In some embodiments, Non-Real Time RIC 103 may identify that the requests should be forwarded to OICF 107 via some other suitable mechanism or methodology.

As further shown, OICF 107 may generate and/or modify (at 710) data structure 701 or some other suitable data structure, maintaining information associating respective rApps 105 with requested information types and presentation parameters. As discussed below, OICF 107 may use such information to route, process, present, etc. received core network information.

As shown in FIG. 8, NF 101-4 and/or OICF 107 may obtain the requested core network information via the SBIs associated with the requested core network information. For example, NF 101-4 and/or OICF 107 may request InfoType_$A_C$ from NF 101-1, which may include periodic and/or intermittent requests for information over time (e.g., on a "pull" basis), and/or may include a request to "subscribe" to InfoType_$A_C$ from NF 101-1. For example, based on the subscription to InfoType_$A_C$, NF 101-1 may "push" the requested InfoType_$A_C$ to NF 101-4 and/or OICF 107 (e.g., via the Nnf4 SBI periodically, intermittently, based on the occurrence of one or more events, or on some other suitable basis) over time. Additionally, or alternatively, NF 101-4 and/or OICF 107 may request InfoType_$A_C$ from a management and/or routing platform associated with the 5GC, which may provide the request for InfoType_$A_C$ to NF 101-1 (and/or may specify the Nnf1 SBI in the request for InfoType_$A_C$), as well as indicating that the requested information should be provided to NF 101-4 and/or OICF 107 (e.g., via the Nnf4 SBI). Additionally, NF 101-4 and/or OICF 107 may request InfoType_$B_C$ from NF 101-2 (e.g., via the Nnf2 interface), and/or may otherwise suitable indicate (e.g., directly or indirectly, as discussed above) to NF 101-2 that InfoType_$B_C$ should be provided to NF 101-4 and/or OICF 107 (e.g., on a "pull" or "push" basis, as discussed above).

When NF 101-4 and/or OICF 107 receive the requested core network information (e.g., InfoType_$A_C$ and/or Info-Type_$B_C$) from NFs 101-1 and 101-2, OICF 107 may identify particular presentation parameters associated with each respective core network information request (e.g., associated with each respective one of rApps 105-1, 105-2, and 105-3), and may provide the core network information to Non-Real Time RIC 103 in accordance with such presentation parameters. For example, referring to the examples discussed above, OICF 107 may reformat, translate, etc. InfoType_$A_C$ to another set of protocols, standards, etc. associated with InfoType_$1_C$, and may provide InfoType_$1_C$ to Non-Real Time RIC 103 in accordance with PresentationParams_1 (e.g., may provide, on a daily basis, a 3-day average of values of InfoType_$A_C$ received from NF 101-1 and/or of values of InfoType_$1_C$ determined based on translating or otherwise processing InfoType_$A_C$).

Further, OICF 107 may provide one or more values associated with InfoType_$2_C$ (e.g., based on values of InfoType_$B_C$ received from NF 101-2 via the Nnf4 SBI) in accordance with PresentationParams_2 to Non-Real Time RIC 103. Additionally, OICF 107 may provide one or more values associated with InfoType_$2_C$ (e.g., based on values of InfoType_$B_C$ received from NF 101-2 via the Nnf4 SBI) in accordance with PresentationParams_3 to Non-Real Time RIC 103. When providing the core network information in accordance with respective sets of presentation parameters (e.g., associated with each respective requestor rApp 105) to Non-Real Time RIC 103, OICF 107 may indicate (e.g., based on information maintained in data structure 701) which respective rApp 105 is an intended recipient of each set of core network information. In this manner, Non-Real Time RIC 103 may forward the received core network information, in accordance with the three example respective sets of presentation parameters, to the appropriate requestor rApps 105. Thus, although rApps 105-2 and 105-3 are both requesting information associated with the same InfoType_$2_C$, rApps 105-2 and 105-3 may receive different values and/or at different intervals based on the differing presentation parameters.

Figure 9:
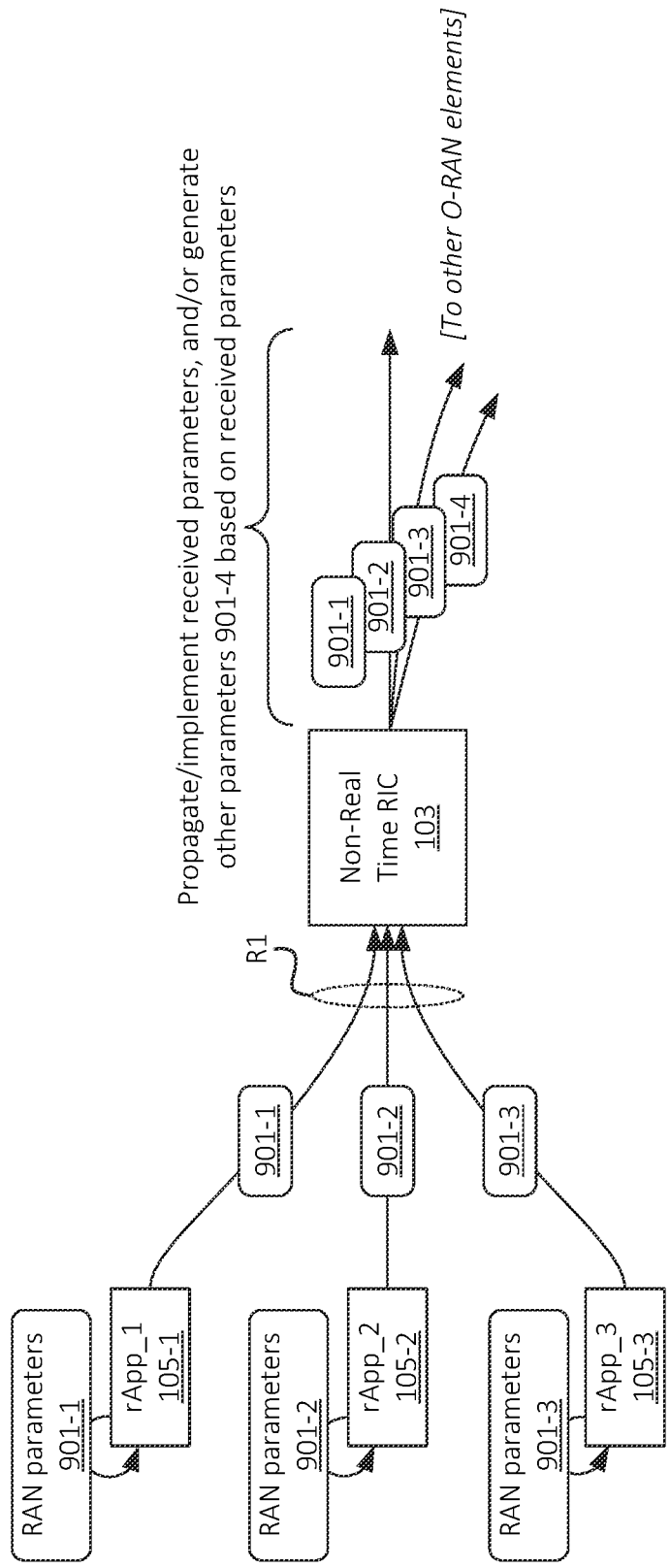

Based on receiving the core network information, Non-Real Time RIC 103 and/or rApps 105 may generate RAN parameters, processed or aggregated analytic information, recommendations, reports, or other suitable information, based on which parameters of the O-RAN may be modified. As discussed above, such modifications may be performed to account for performance degradations or other attributes or characteristics of the core network. For example, as shown in FIG. 9, rApp 105-1 may generate a first set of RAN parameters, recommendations, reports, alerts, etc. (referred to simply as "RAN parameters" 901-1 for the sake of brevity) based on the received core network information and/or other suitable information. Similarly, rApp 105-2 may generate a second set of RAN parameters 901-2, and rApp 105-3 may generate a third set of RAN parameters 901-3. In some embodiments, rApps 105 may provide RAN parameters 901 to Non-Real Time MC 103 (e.g., via the R1 interface), which may propagate RAN parameters 901-1, 901-2, and 901-3 to suitable elements of the O-RAN in order to implement RAN parameters 901-1, 901-2, and 901-3. Additionally, or alternatively, Non-Real Time RIC 103 may generate a fourth set of RAN parameters 901-4 based on RAN parameters 901-1, 901-2, 901-3, and/or other suitable information, and may propagate RAN parameters 901-4 to one or more elements of the O-RAN in order to implement RAN parameters 901-4. In this manner, parameters of the O-RAN may be modified to account for, compensate for, etc. core network analytics information, core network event information, and/or other information, in order to facilitate the delivery of end-to-end QoS parameters to traffic that traverses the O-RAN and the core network.

Figure 10:
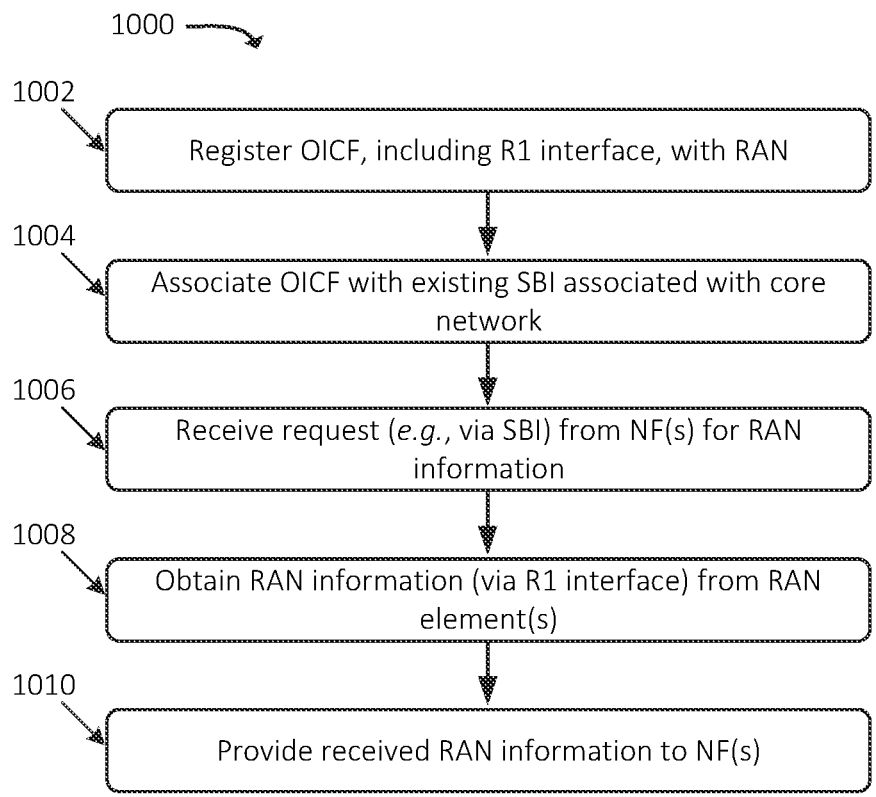
FIG. 10 illustrates an example process for obtaining RAN information from a RAN, in accordance with some embodiments.

FIG. 10 illustrates an example process 1000 for obtaining (e.g., by a core network) RAN information from a RAN (e.g., an O-RAN). In some embodiments, some or all of process 1000 may be performed by OICF 107. In some embodiments, one or more other devices may perform some or all of process 1000 in concert with, and/or in lieu of, OICF 107, such as a particular NF 101.

As shown, process 1000 may include registering (at 1002) OICF 107 with a RAN, such as an O-RAN. For example, as discussed above, OICF 107 may be registered with Non-Real Time RIC 103 of the O-RAN, an SMO framework of the O-RAN, and/or some other suitable element of the O-RAN in order to associate OICF 107 with an R1 interface (e.g., via which OICF 107 may communicate with Non-Real Time RIC 103 and/or other suitable elements of the O-RAN that communicate via the R1 interface). As discussed above, registering OICF 107 may include providing an IP address or other locator information associated with OICF 107, such that Non-Real Time RIC 103 and/or other elements of the O-RAN are able to route communications, received via the R1 interface and directed to OICF 107, to OICF 107 via the IP address or other locator information.

Process 1000 may also include associating (at 1004) OICF 107 with an existing SBI associated with a particular core network. For example, as discussed above with respect to FIGS. 1A-1C, some or all functions described with respect to OICF 107 may be performed by a particular NF 101 of a core network (e.g., a 5GC). For example, functions of an existing NF 101 (e.g., a DCCF, an NWDAF, an AMF, etc.) may be enhanced to include some or all of the functions described herein with respect to OICF 107. Additionally, or alternatively, OICF 107 may be implemented by a separate device or system from NF 101, and an API or other suitable communication pathway may be established between OICF 107 and NF 101. In such embodiments, associating OICF 107 with the existing SBI may include providing an IP address or other locator information, associated with OICF 107, to NF 101, such that NF 101 is able to route communications, received via the SBI associated with NF 101 and intended for OICF 107, to OICF 107 via such IP address or other locator information.

Process 1000 may further include receiving (at 1006) a request, from one or more NFs 101 or other elements of the core network, for particular RAN information. For example, as discussed above, OICF 107 may receive the request via an SBI associated with a particular NF 101 (e.g., the Nnf4 SBI associated with NF 101-4, in the examples provided above), from one or more other NFs 101 of the core network. As discussed above, the requests for RAN information may further specify presentation parameters, which indicate a manner in which OICF 107 should process, format, or otherwise present the requested information.

Process 1000 may additionally include obtaining (at 1008) the requested RAN information from the RAN. For example, OICF 107 may request (e.g., via an R1 interface) particular types of RAN information based on requests from particular NFs 101, which may include translating, reformatting, etc. requests from NFs 101 to a format, protocol, standard, etc. supported by, implemented by, or otherwise compatible with RAN information requests handled by the RAN (e.g., by Non-Real Time MC 103). OICF 107 may receive the requested RAN information from Non-Real Time MC 103, which may obtain such information from one or more rApps 105 or other elements of the RAN. For example, Non-Real Time MC 103 may output the RAN information to OICF 107 via the registered R1 interface associated with OICF 107.

Process 1000 may also include providing (at 1010) the received RAN information to the respective NFs 101 that requested the RAN information. For example, OICF 107 may provide the received RAN information to the particular NFs 101 that requested the RAN information, via an SBI associated with the particular NF 101 that implements the functions of OICF 107 and/or to which OICF 107 is communicatively coupled. As discussed above, the core network may modify parameters of services provided via the core network and/or the RAN based on the received information, which may include accounting for performance metrics, service degradations, congestion, etc. which may be indicated by the received RAN information.

Figure 11:
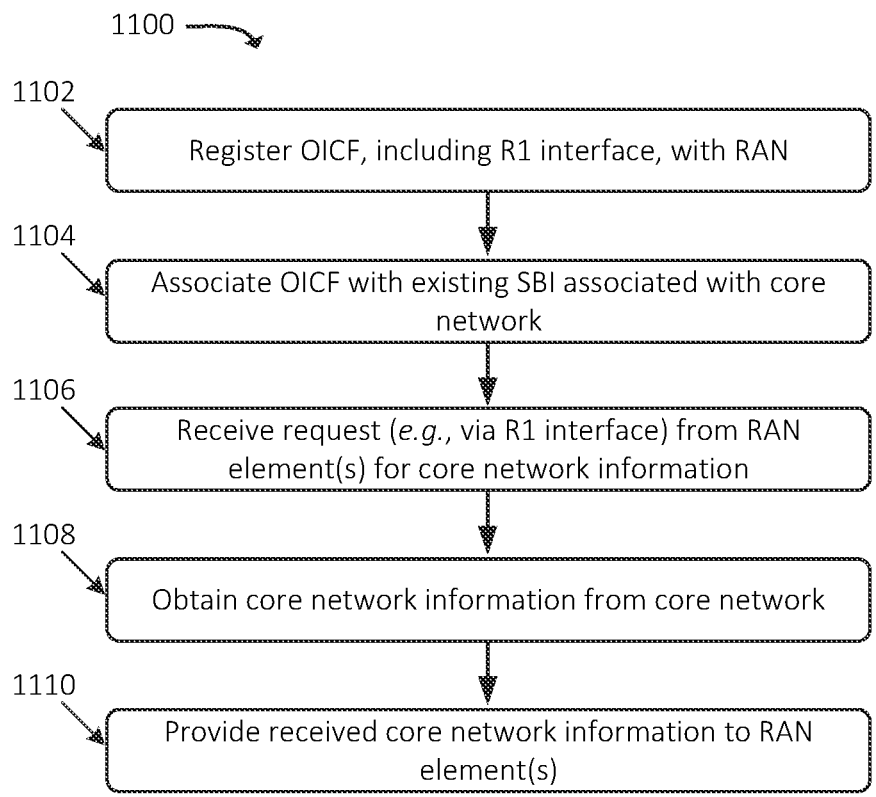
FIG. 11 illustrates an example process for obtaining core network information from a core network, in accordance with some embodiments.

FIG. 11 illustrates an example process 1100 for obtaining (e.g., by a RAN) core network information from a core network. In some embodiments, some or all of process 1100 may be performed by OICF 107. In some embodiments, one or more other devices may perform some or all of process 1100 in concert with, and/or in lieu of, OICF 107, such as a particular NF 101.

As shown, process 1100 may include registering (at 1102) OICF 107 with a RAN, such as an O-RAN. For example, as similarly discussed above, OICF 107 may be registered with Non-Real Time RIC 103 of the O-RAN, an SMO framework of the O-RAN, and/or some other suitable element of the O-RAN in order to associate OICF 107 with an R1 interface (e.g., via which OICF 107 may communicate with Non-Real Time RIC 103 and/or other suitable elements of the O-RAN that communicate via the R1 interface).

Process 1100 may also include associating (at 1104) OICF 107 with an existing SBI associated with a particular core network. For example, as discussed above with respect to FIGS. 1A-1C, some or all functions described with respect to OICF 107 may be performed by a particular NF 101 of a core network (e.g., a 5GC), and/or OICF 107 may be communicatively coupled (e.g., via an API or other suitable communication pathway) to the particular NF 101 of the core network.

Process 1100 may further include receiving (at 1106) a request for core network information. For example, OICF 107 may receive the request from one or more rApps 105 of the RAN (e.g., via an R1 interface implemented by rApps 105 and/or OICF 107), from Non-Real Time RIC 103 (e.g., via the R1 interface associated with OICF 107), and/or from some other element of the RAN. The requested core network information may include, for example, core network analytics information, core network event information, core network configuration information, or other suitable types of information that is monitored by, provided by, etc. the core network.

Process 1100 may additionally include obtaining (at 1108) the core network information from the core network via the particular NF 101 with which OICF 107 is associated (e.g., the particular NF 101 that implements some or all of the functionality of OICF 107, and/or to which OICF 107 is communicatively coupled). For example, as discussed above, OICF 107 (and/or the particular NF 101 with which OICF 107 is associated) may identify one or more particular SBIs (e.g., associated with one or more respective NFs 101) from which the requested core network information may be obtained, and may request the core network information via the identified SBIs associated with such NFs 101. In some embodiments, when requesting the core network information, the particular NF 101 with which OICF is associated 107 may indicate or otherwise include the SBI associated with the particular NF (e.g., the Nnf4 SBI associated with NF 101-4, in the examples presented above), such that elements of the core network are able to provide the requested information to OICF 107 via such SBI.

Process 1100 may also include providing (at 1110) the received core network information to one or more RAN elements. For example, OICF 107 may provide the core network information to one or more rApps 105, Non-Real Time RIC 103, and/or other suitable elements of the RAN, via the R1 interface registered with respect to OICF 107. In some embodiments, as discussed above, OICF 107 may reformat, process, and/or perform other operations on (e.g., based on presentation parameters) the received core network information prior to providing the core network information to rApps 105, Non-Real Time RIC 103, and/or other elements of the RAN. As discussed above, rApps 105, Non-Real Time RIC 103, etc. may modify configuration parameters of the RAN, such as beamforming parameters, QoS parameters, and/or other parameters based on the received core network information and/or other information (e.g., RAN analytics information or other RAN information), in order to deliver a threshold level of end-to-end performance and/or enhance overall network efficiency.

Figure 12:
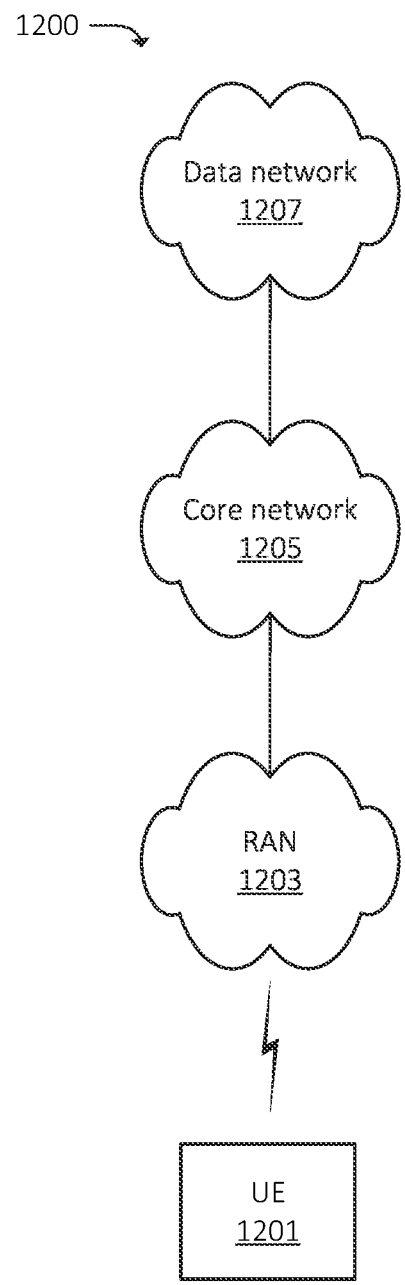
FIG. 12 illustrates an example environment in which one or more embodiments, described herein, may be implemented.

FIG. 12 illustrates an example environment 1200, in which one or more embodiments may be implemented. In some embodiments, environment 1200 may correspond to a 5G network, and/or may include elements of a 5G network. As shown, environment 1200 may include UE 1201, RAN 1203 (which may include one or more Next Generation Node Bs ("gNBs") and/or evolved Node Bs ("eNBs")), and core network 1205. In some embodiments, environment 1200 may correspond to a 5G Non-Standalone ("NSA") architecture, in which a 5G radio access technology ("RAT") may be used in conjunction with one or more other RATs (e.g., a LTE RAT), and/or in which elements of a 5G core network may be implemented by, may be communicatively coupled with, and/or may include elements of another type of core network (e.g., an EPC).

In some embodiments, RAN 1203 may be, may include, and/or may implement an O-RAN. In some embodiments, core network 1205 may be, may include, and/or may implement a 5GC and/or some other type of core network that utilizes SBIs or other types of routing mechanisms by which different elements may be associated with different interfaces, identifiers, etc. used to route communications to such elements. In some embodiments, core network 1205 may include various NFs 101, such as an AMF, a Serving Gateway ("SGW"), an SMF, a PCF, an Application Function ("AF"), a UPF, a UDM, an Authentication Server Function ("AUSF"), a DCCF, an NWDAF, and/or other types of NFs 101. As discussed above, core network 1205 may also include NRF 201 and/or some other suitable element that maintains information associating particular NFs 101 with particular SBIs. Environment 1200 may also include one or more networks, such as Data Network ("DN") 1207.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, environment 1200 may include devices that facilitate or enable communication between various components shown in environment 1200, such as routers, modems, gateways, switches, hubs, etc. Elements of environment 1200 may interconnect with each other and/or other elements via wired connections, wireless connections, or a combination of wired and wireless connections. In some implementations, one or more elements of environment 1200 may be physically integrated in, and/or may be physically attached to, one or more other elements of environment 1200.

UE 1201 may include a computation and communication device, such as a wireless mobile communication device that is capable of communicating with RAN 1203, RAN 1212, and/or DN 1207. UE 1201 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, IoT device (e.g., a sensor, a smart home appliance, a wearable device, a Machine-to-Machine ("M2M") device, or the like), an AGV, or another type of mobile computation and communication device. UE 1201 may send traffic (e.g., user plane traffic) to and/or receive traffic from DN 1207 via RAN 1203 and core network 1205 (e.g., via a UPF of core network 1205).

RAN 1203 may be, or may include, a 5G RAN, an LTE RAN, and/or some other type of RAN that includes one or more base stations (e.g., one or more gNBs, eNBs, and/or other types of base stations), via which UE 1201 may communicate with one or more other elements of environment 1200. UE 1201 may communicate with RAN 1203 via an air interface (e.g., as provided by a gNB, an eNB, etc.). For instance, RAN 1203 may receive traffic (e.g., user plane traffic such as voice call traffic, data traffic, messaging traffic, etc.) from UE 1201 via the air interface, and may communicate the traffic to core network 1205 (e.g., a UPF of core network 1205). Further, RAN 1203 may receive signaling traffic, control plane traffic, etc. from UE 1201 via the air interface, and may communicate such signaling traffic, control plane traffic, etc. to an AMF associated with core network 1205. Additionally, RAN 1203 may receive traffic intended for UE 1201 (e.g., from a UPF, an AMF, and/or one or more other devices or networks) and may communicate the traffic to UE 1201 via the air interface.

As noted above, core network 1205 may include one or more particular types of NFs 101, such as an AMF. The AMF may include one or more devices, systems, Virtualized Network Functions ("VNFs"), Cloud-Native Network Functions ("CNF s"), etc., that perform operations to register UE 1201 with the RAN 1203 and/or core network 1205, to establish bearer channels associated with a session with UE 1201, to facilitate handovers or other mobility events associated with UE 1201, and/or to perform other suitable operations. The AMF may, in some embodiments, be associated with an Namf SBI or other suitable SBI.

In some embodiments, one or more NFs 101 of core network 1205 may include an SMF, which may include one or more devices, systems, VNFs, CNFs, etc., that gather, process, store, and/or provide information in a manner described herein. The SMF may, for example, facilitate the establishment of communication sessions on behalf of UE 1201. In some embodiments, the establishment of communications sessions may be performed in accordance with one or more policies provided by a PCF of core network 1205. The SMF may, in some embodiments, be associated with an Nsmf SBI or other suitable SBI.

The PCF of core network 1205 may include one or more devices, systems, VNFs, CNFs, etc., that aggregate and/or provide policy information. For example, the PCF may receive information regarding policies and/or subscriptions from one or more sources, such as subscriber databases and/or from one or more users (such as, for example, an administrator associated with the PCF and/or core network 1205), and may provide such information to one or more other NFs 101 of core network 1205. The PCF may, in some embodiments, be associated with an Npcf SBI or other suitable SBI.

An AF associated with, and/or communicatively coupled to, core network 1205 may include one or more devices, systems, VNFs, CNFs, etc., that receive, store, and/or provide information that may be used in determining parameters (e.g., quality of service parameters, charging parameters, or the like) for certain applications. The AF may, in some embodiments, provide services to UE 1201 via core network 1205 and/or RAN 1203. The AF may, in some embodiments, be associated with an Naf SBI or other suitable SBI.

A UPF of core network 1205 (e.g., as implemented by one or more NFs 101) may include one or more devices, systems, VNFs, CNFs, etc., that receive, store, and/or provide data (e.g., user plane data). For example, the UPF may receive user plane data (e.g., voice call traffic, data traffic, etc.), destined for UE 1201, from DN 1207, and may forward the user plane data toward UE 1201 (e.g., via RAN 1203, an SMF, and/or one or more other devices or networks). Similarly, the UPF may receive traffic from UE 1201 (e.g., via RAN 1203, the SMF, and/or one or more other devices or networks), and may forward the traffic toward DN 1207. In some embodiments, the UPF may communicate with the SMF regarding user plane data processed by the UPF. The UPF may, in some embodiments, be associated with an Nupf SBI or other suitable SBI.

A UDM and/or AUSF of core network 1205 may include one or more devices, systems, VNFs, CNFs, etc., that manage, update, and/or store, in one or more memory devices or cloud-based storage systems, profile information associated with one or more subscribers or UEs 1201. The AUSF and/or UDM may perform authentication, authorization, and/or accounting operations associated with the subscriber and/or a communication session with UE 1201. The UDM may, in some embodiments, be associated with an Nudm SBI or other suitable SBI. The AUSF may, in some embodiments, be associated with an Nausf SBI or other suitable SBI.

DN 1207 may include one or more wired and/or wireless networks. For example, DN 1207 may include an IP-based Packet Data Network ("PDN"), a wide area network ("WAN") such as the Internet, a private enterprise network, and/or one or more other networks. UE 1201 may communicate, through DN 1207, with data servers, other UEs 1201, and/or to other servers or applications that are coupled to DN 1207. DN 1207 may be connected to one or more other networks, such as a public switched telephone network ("PSTN"), a public land mobile network ("PLMN"), and/or another network. DN 1207 may be connected to one or more devices, such as content providers, applications, web servers, and/or other devices, with which UE 1201 may communicate.

Figure 13:
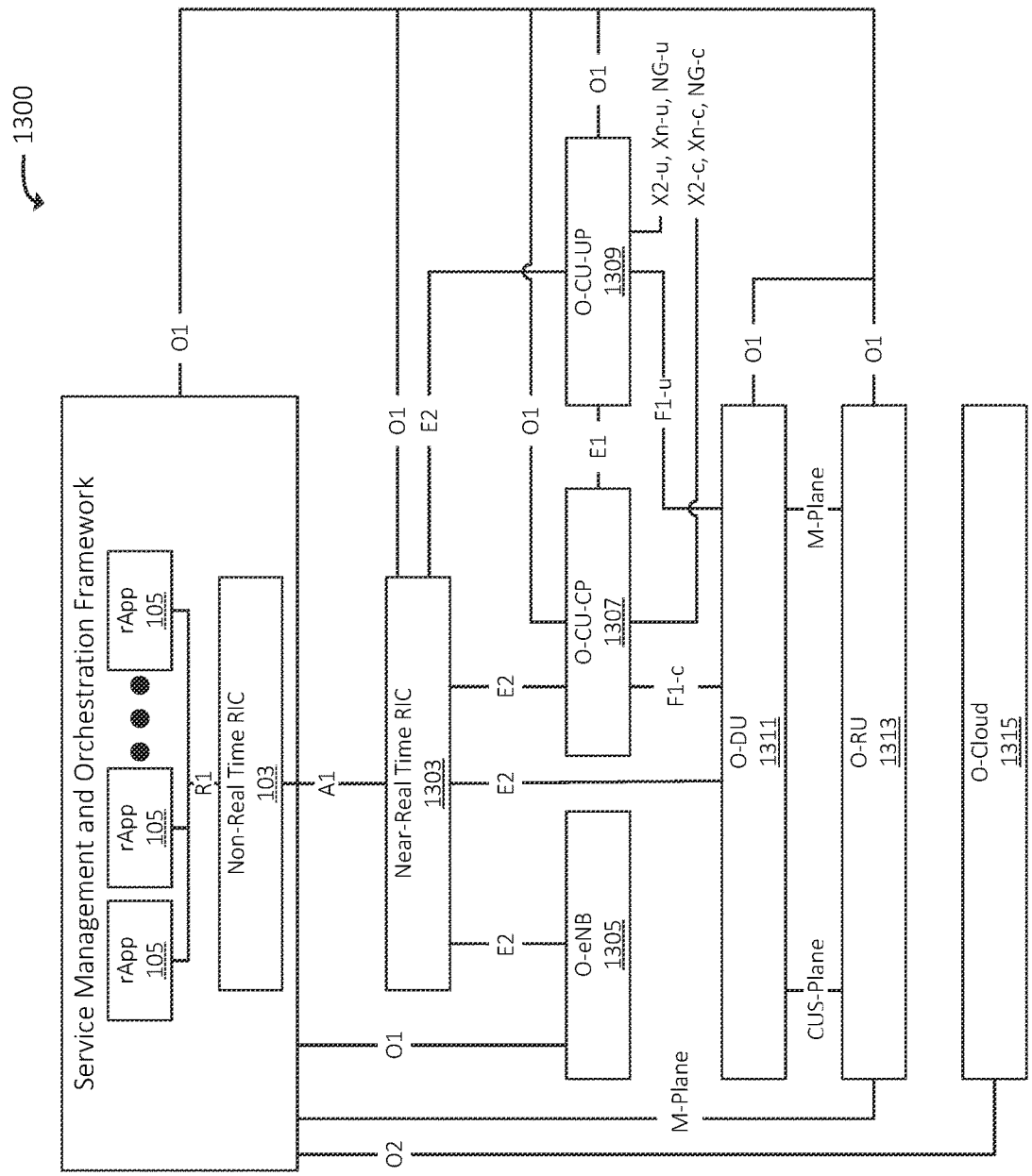
FIG. 13 illustrates an example arrangement of an Open RAN ("O-RAN") environment in which one or more embodiments, described herein, may be implemented.

FIG. 13 illustrates an example O-RAN environment 1300, which may correspond to RAN 1203. For example, RAN 1203 may include one or more instances of O-RAN environment 1300, and/or one or more instances of O-RAN environment 1300 may implement RAN 1203 and/or some portion thereof. As shown, O-RAN environment 1300 may include Non-Real Time RIC 103, one or more rApps 105, Near-Real Time MC 1303, O-eNB 1305, O-Central Unit-Control Plane ("O-CU-CP") 1307, O-CU-User Plane ("O-CU-UP") 1309, O-Distributed Unit ("O-DU") 1311, O-Radio Unit ("RU") 1313, and O-Cloud 1315. In some embodiments, O-RAN environment 1300 may include additional, fewer, different, and/or differently arranged components.

In some embodiments, some or all of the elements of O-RAN environment 1300 may be implemented by one or more configurable or provisionable resources, such as virtual machines, cloud computing systems, physical servers, and/or other types of configurable or provisionable resources. In some embodiments, some or all of O-RAN environment 1300 may be implemented by, and/or communicatively coupled to, one or more MECs $r07.

Non-Real Time RIC 103 and Near-Real Time RIC 1303 may receive performance information (and/or other types of information) from one or more sources, and may configure other elements of O-RAN environment 1300 based on such performance or other information. For example, Near-Real Time RIC 1303 may receive performance information, via one or more E2 interfaces, from O-eNB 1305, O-CU-CP 1307, and/or O-CU-UP 1309, and may modify parameters associated with O-eNB 1305, O-CU-CP 1307, and/or O-CU-UP 1309 based on such performance information. Similarly, Non-Real Time RIC 103 may receive performance information associated with O-eNB 1305, O-CU-CP 1307, O-CU-UP 1309, and/or one or more other elements of O-RAN environment 1300 and may utilize machine learning and/or other higher level computing or processing to determine modifications to the configuration of O-eNB 1305, O-CU-CP 1307, O-CU-UP 1309, and/or other elements of O-RAN environment 1300. As another example, as discussed above, Non-Real Time RIC 103 may receive configuration parameters, recommendations, alerts, aggregated analytics and/or event information, etc. from one or more rApps 105, and may determine modifications to the configuration of O-eNB 1305, O-CU-CP 1307, O-CU-UP 1309, and/or other elements of O-RAN environment 1300 based on information received from rApps 105. Additionally, or alternatively, as discussed above, Non-Real Time RIC 103 may receive core network information (e.g., from one or more elements of core network 1205, in accordance with embodiments discussed above), and may determine modifications to the configuration of O-eNB 1305, O-CU-CP 1307, O-CU-UP 1309, and/or other elements of O-RAN environment 1300 based on core network information received from core network 1205. In some embodiments, Non-Real Time MC 103 may generate machine learning models based on performance information associated with O-RAN environment 1300 or other sources, and may provide such models to Near-Real Time MC 1303 for implementation.

O-eNB 1305 may facilitate wireless communications between UE 1201 and a core network. O-CU-CP 1307 may perform control plane signaling to coordinate the aggregation and/or distribution of traffic via one or more DUs $r03, which may include and/or be implemented by one or more O-DUs 1311, and O-CU-UP 1309 may perform the aggregation and/or distribution of traffic via such DUs $r03 (e.g., O-DUs 1311). O-DU 1311 may be communicatively coupled to one or more RUs $r01, which may include and/or may be implemented by one or more O-RUs 1313. In some embodiments, O-Cloud 1315 may include or be implemented by one or more Multi-Access/Mobile Edge Computing ("MEC") devices, referred to sometimes herein simply as "MECs," which may provide services, and may be communicatively coupled, to O-CU-CP 1307, O-CU-UP 1309, O-DU 1311, and/or O-RU 1313 (e.g., via an O1 and/or O2 interface).

Figure 14:
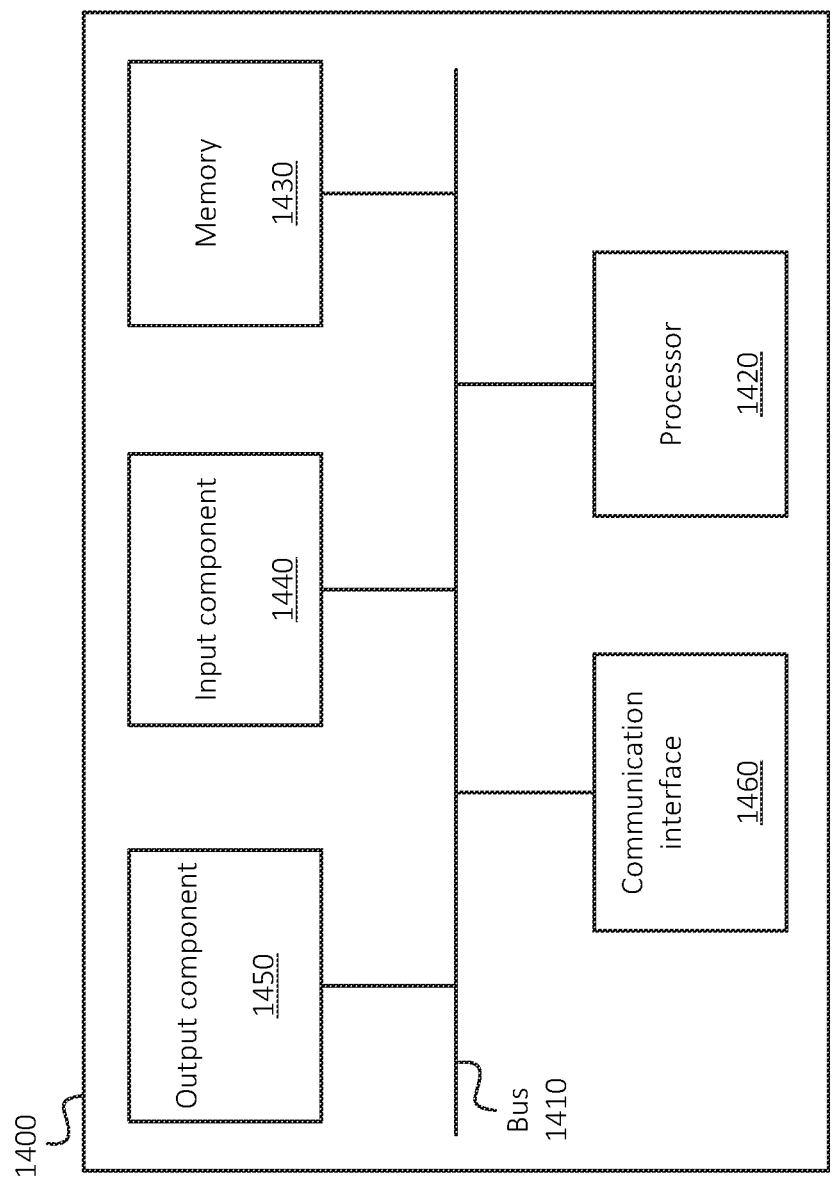
FIG. 14 illustrates example components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. In some embodiments, processor 1420 may be or may include one or more hardware processors. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400 and/or other receives or detects input from a source external to 1440, such as a touchpad, a touchscreen, a keyboard, a keypad, a button, a switch, a microphone or other audio input component, etc. In some embodiments, input component 1440 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1A-11), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   register a particular interface with a radio access network ("RAN") of a wireless network, wherein the RAN maintains information associating the device with the particular interface;
   associate the device with a particular Service-Based Interface ("SBI") of a core network that includes a plurality of network functions ("NFs"), wherein each NF is associated with a respective SBI;
   receive, via the particular SBI, a request for RAN information from one or more NFs of the core network;
   obtain, via the particular interface with the RAN, the RAN information from the RAN; and
   output, via the particular SBI, the requested RAN information to the one or more NFs of the core network.

2. The device of claim 1, wherein the RAN includes an Open-RAN ("O-RAN").

3. The device of claim 2, wherein the particular interface includes an O-RAN R1 interface.

4. The device of claim 2, wherein the particular interface includes an interface between the device and a Non-Real Time RAN Intelligent Controller ("RIC") of the O-RAN.

5. The device of claim 1, wherein associating the device with the particular SBI is performed without adding an additional SBI, associated with the device, to the core network.

6. The device of claim 1, wherein the core network includes an Network Repository Function ("NRF") that maintains information associating the plurality of NFs with respective SBIs, wherein associating the device with the particular SBI is performed without modifying the information maintained by the NRF.

7. The device of claim 1, wherein associating the device with the particular SBI includes establishing an interface with a particular NF, of the plurality of NFs, that is associated with the particular SBI.

8. A non-transitory computer-readable medium, storing a plurality of processor-executable instructions, to:
   register a particular interface between a device and a radio access network ("RAN") of a wireless network, wherein the RAN maintains information associating the device with the particular interface;
   associate the device with a particular Service-Based Interface ("SBI") of a core network that includes a plurality of network functions ("NFs"), wherein each NF is associated with a respective SBI;

receive, via the particular SBI, a request for RAN information from one or more NFs of the core network;

obtain, via the particular interface with the RAN, the RAN information from the RAN; and output, via the particular SBI, the requested RAN information to the one or more NFs of the core network.

9. The non-transitory computer-readable medium of claim 8, wherein the RAN includes an Open-RAN ("O-RAN").

10. The non-transitory computer-readable medium of claim 9, wherein the particular interface includes an O-RAN R1 interface.

11. The non-transitory computer-readable medium of claim 9, wherein the particular interface includes an interface between the device and a Non-Real Time RAN Intelligent Controller ("RIC") of the O-RAN.

12. The non-transitory computer-readable medium of claim 8, wherein associating the device with the particular SBI is performed without adding an additional SBI, associated with the device, to the core network.

13. The non-transitory computer-readable medium of claim 8, wherein the core network includes an Network Repository Function ("NRF") that maintains information associating the plurality of NFs with respective SBIs, wherein associating the device with the particular SBI is performed without modifying the information maintained by the NRF.

14. The non-transitory computer-readable medium of claim 8, wherein associating the device with the particular SBI includes establishing an interface with a particular NF, of the plurality of NFs, that is associated with the particular SBI.

15. A method, comprising:

registering a particular interface between a device and a radio access network ("RAN") of a wireless network, wherein the RAN maintains information associating the device with the particular interface;

associating the device with a particular Service-Based Interface ("SBI") of a core network that includes a plurality of network functions ("NFs"), wherein each NF is associated with a respective SBI;

receiving, via the particular SBI, a request for RAN information from one or more NFs of the core network;

obtaining, via the particular interface with the RAN, the RAN information from the RAN; and outputting, via the particular SBI, the requested RAN information to the one or more NFs of the core network.

16. The method of claim 15, wherein the particular interface includes an Open-RAN ("O-RAN") R1 interface.

17. The method of claim 15, wherein the particular interface includes an interface between the device and an Open-RAN ("O-RAN") Non-Real Time RAN Intelligent Controller ("RIC").

18. The method of claim 15, wherein associating the device with the particular SBI is performed without adding an additional SBI, associated with the device, to the core network.

19. The method of claim 15, wherein the core network includes an Network Repository Function ("NRF") that maintains information associating the plurality of NFs with respective SBIs, wherein associating the device with the particular SBI is performed without modifying the information maintained by the NRF.

20. The method of claim 15, wherein associating the device with the particular SBI includes establishing an interface with a particular NF, of the plurality of NFs, that is associated with the particular SBI.

* * * * *